United States Patent [19]

Williamson

[11] Patent Number: 4,979,573

[45] Date of Patent: Dec. 25, 1990

[54] LAWN EDGER APPARATUS

[76] Inventor: James B. Williamson, Rte. 3. Box 14076, Peyton, Colo. 80831

[21] Appl. No.: 306,859

[22] Filed: Feb. 7, 1989

[51] Int. Cl.$^5$ .............................................. A01B 45/04
[52] U.S. Cl. ...................................... 172/15; 172/385; 172/112; 172/415; 56/17.2
[58] Field of Search .................... 56/17.2; 172/610, 13, 172/14, 15, 16, 17, 383, 415, 385, 386; 280/855

[56] References Cited

U.S. PATENT DOCUMENTS

| | | | |
|---|---|---|---|
| 2,178,288 | 10/1939 | Potts | 280/855 |
| 2,432,922 | 12/1947 | Muzzy | 172/15 |
| 2,691,264 | 10/1954 | Miller | 56/17.2 |
| 2,706,941 | 4/1955 | Swanson | 172/15 |
| 2,725,813 | 12/1955 | Stoeber | 172/16 |
| 2,767,541 | 10/1956 | Jacoby | 172/15 |
| 2,826,889 | 3/1958 | Menge | 172/15 X |
| 2,882,977 | 4/1959 | Smith | 172/15 |
| 2,934,875 | 5/1960 | Katzfey | 56/17.2 |
| 3,006,421 | 10/1961 | Feilbach | 172/15 |
| 3,357,497 | 12/1967 | Simolka | 172/16 |
| 3,475,887 | 11/1969 | Price | 172/15 |
| 3,627,055 | 12/1971 | Lay | 172/17 |

Primary Examiner—Richard J. Johnson
Attorney, Agent, or Firm—Phillip A. Rein

[57] ABSTRACT

This invention relates to a heavy duty commercial lawn edger apparatus utilized to achieve a new and novel contoured edge cut between adjacent portions of a grass area and a concrete or curb area. The lawn edger apparatus includes a main support base assembly directed by a main handle and control assembly and having a main power assembly mounted thereon. The main power assembly is connectable through a belt and pulley drive assembly to selectively drive a main edging and cleaner assembly. The main edging and cleaner assembly includes a heavy duty blade assembly; a main brush assembly mounted adjacent the main blade assembly for surface cleansing purposes; and an adaptor cutter assembly releasably connected to the main blade assembly to achieve unique shapes in the contoured edge cut. The main blade assembly includes a thick main blade member having spaced cut out sections to achieve a novel cutting feature of this invention. The adaptor cutter assembly includes various embodiments of a contour cutter assembly to achieve a right angular or contoured shape in the contoured edge cut and to sever the grass adjacent thereto. The main support base assembly includes a front guide wheel assembly which can be vertically and angularly adjustable to create a biasing effect of the main edging and cleaner assembly against a vertical surface of the concrete or curb member being edged. The main edging and cleaner assembly includes a cover shield assembly to enclose the rotating blade, brush, and cutter assemblies and operable to receive and direct the debris and cut grass rearwardly, laterally, and downwardly for a safety feature plus eliminating subsequent clean up operations for the lawn edger apparatus operator.

7 Claims, 4 Drawing Sheets

Fig_9

Fig_10

Fig_11

Fig_12

LAWN EDGER APPARATUS

PRIOR ART

A patent search on this invention revealed the following United States Patents:

| U.S. Pat. No. | Invention | Inventor |
| --- | --- | --- |
| 892,027 | TRENCHING TOOL | E. B. Cahoon |
| 2,745,331 | LAWN EDGERS | L. Lancour |
| 2,826,889 | EDGER AND TRIMMER FOR LAWNS AND THE LIKE | T. L. Menge |
| 3,141,507 | CURB TRIMMING MACHINE CONDITIONING SYSTEM | A. G. Henry et al |
| 3,620,307 | GOLF COURSE GREEN OR YARD BORDER CUTTER | Antone Vilela |
| 3,627,055 | LAWN EDGER WITH GUIDING DEVICE | Michael T. Lay |
| 4,002,205 | HORTICULTURAL DEVICE | David C. Falk |
| 4,046,200 | LAWN EDGER ATTACHMENT | Mullet et al |
| 4,200,155 | LAWN EDGER ATTACHMENT | Mullet et al |
| 4,463,544 | EDGER | Carsello et al |

The Cahoon patent discloses the use of hub structures applied to a rotating blade to maintain the proper relationship relative to a curb during a cutting operation.

The Lancour patent discloses a circular shaped lawn edger blade structure having cutout portions and four projections extended from one side thereof. Two of the projections are operable to achieve a cut channel and the other projections are operable to contact and lift the cut sections from the soil.

The Menge patent discloses an edger and trimmer structure having a brush member mounted on a shaft driving a circular blade member for conjoint rotation therewith. The brush member has the purpose and function of removing overlying grass and weeds on a top surface of an adjacent concrete curb or sidewalk.

The Henry et al patent discloses a curb trimming machine being operable to cut out a right triangular shape in a grassy area adjacent to a concrete sidewalk or curb area.

The Vilela patent discloses an edger structure having a circular blade and an adjustable front wheel structure to control the depth of a cut being created.

The Lay patent discloses a lawn edger with a small wheel assembly which is turned inwardly so as to bias a blade structure against a curb being edged.

The Falk patent discloses an edger structure having a special blade structure which is adapted to cut a right triangular shaped opening.

The Mullet et al U.S. Pat. No. 4,046,200 discloses a lawn edger attachment having a brush structure mounted thereon for the purpose of sweeping grass cuttings either toward a pavement or grass area.

The Mullet et al U.S. Pat. No. 4,200,155 discloses a lawn edger attachment utilizing a curved blade member in order to bias subject blade against a vertical edge of a paved surface, such as a curb, during an edging operation.

The Carsello et al patent discloses a feature of angularly adjusting a cutting blade so as to achieve a right triangular shaped cut.

PREFERRED EMBODIMENT OF THE INVENTION

In one preferred embodiment of this invention, a lawn edger apparatus is provided to cut a contoured edge cut between a grass area and a concrete area such as a curb member or sidewalk. The lawn edger apparatus includes (1) a main support base assembly; (2) a main handle and control assembly connected to the main support base assembly; (3) a main power supply assembly mounted on the main support base assembly; and (4) a main edging and cleaning assembly mounted on the main support base assembly being drawn by the main power supply assembly through a belt and pulley drive assembly to achieve the contoured edge cut of this invention. The main support base assembly includes a main support base member vertically supported on a front guide wheel assembly; a rear wheel and cleaner assembly; and an adjustable rear wheel assembly. The front guide wheel assembly is provided with an adjustable wheel member which is operable to bias the entire lawn edger apparatus against a vertical surface of the curb member or sidewalk to achieve the contoured edge cut. The rear wheel and cleaner assembly is provided with a cleaner assembly operable to maintain an adjacent rear wheel member cleansed from mud and dirt accumulating thereon. The adjustable rear wheel assembly has a wheel member which is adjustable vertically so as to provide support thereto on a roadway surface adjacent a curb member during an edging operation. The main handle and control assembly is provided with a handle member similar to a lawn mower structure and having controls thereon to (1) adjust the vertical height of the front guide wheel assembly; (2) control operation of the main power supply assembly; and (3) actuate the belt and pulley drive or shaft member of the main edging and cleaning assembly. The main edging and cleaning assembly is provided with (1) a main blade assembly connected to the driven shaft member of the belt and pulley drive assembly; (2) a main brush assembly mounted adjacent the main blade assembly and operable to contact and clean a top adjacent surface of a concrete curb or sidewalk area during an edging operation of cutting a contoured edge cut; (3) an adapter cutter assembly releasably connected to the main blade assembly to achieve the contoured cut area; and (4) a cover shield assembly mounted about the interconnected blade, brush, and adapter cutter assemblies. The main blade assembly is provided with a blade member of a substantial width and having cut out sections to achieve a vertical rectangular portion of the contoured edge cut of this invention. The main brush assembly includes a brush member being of a diameter less than the main blade member and operable to rest on a portion of the concrete area or curb member adjacent the contoured edge cut. The adapter cutter assembly includes a main support plate having a contoured cutter assembly thereon to achieve a portion of the unique nature of the contoured edge cut. The cover shield assembly is provided with an enclosure housing and having first and second deflector plates to direct the cut grass and other debris rearwardly, laterally, and downwardly as a safety feature of this invention. Another embodiment of the invention includes an adapter and grass assembly having a main support plate with the contoured cutter assembly secured thereto. The contoured cutter assembly includes a grass cutter member to achieve a further unique feature and design in achieving a contoured edge cut having the adjacent grass portion severed at approximately a 45 degree angle away from an adjacent curb member or sidewalk area.

OBJECTS OF THE INVENTION

One object of this invention is to provide a lawn edger apparatus having a new and novel main edging and cleaning assembly operable to create a unique contoured edge cut out between adjacent portions of a grassy area and a concrete area which is attractive in appearance and decreases the frequency of repeat lawn edging operations.

One further object of this invention is to provide a lawn edger apparatus including a main support base assembly provided with a front guide wheel assembly having a vertically adjustable wheel member which is also rotatably adjustable so as to bias the lawn edger apparatus into contact with a vertical surface concrete area or curb member being edged to provide a force to hold a rotatable blade member thereagainst to achieve the unique contoured edge cut of this invention.

One other object of this invention is to provide a lawn edger apparatus having a main support base assembly with an adjustable rear wheel assembly which can be vertically adjustable in increments so as to rest on a roadway below an adjacent curb member so that the lawn edger apparatus can be utilized in any direction of travel to achieve the contoured edge cut.

One further object of this invention is to provide a lawn edger apparatus having a main edging and cleaning assembly comprising (1) a main blade assembly having a unique heavy-duty rotatable blade member for achieving a rectangular cut portion operable to shape and enlarge cracks in asphalt; (2) a main brush assembly mounted adjacent the main blade assembly having a brush member to clean off the debris and cut grass from an adjacent horizontal portion of a concrete area; and (3) an adaptor cutter assembly releasably mounted on the main blade assembly having a contoured cutter assembly to provide a right angle or contoured cut portion of the contoured edge cut to achieve the unique lawn edging operation of this invention.

Still, one further object of this invention is to provide a lawn edger apparatus with a main edging and cleaning assembly having (1) a heavy-duty rotating blade member to achieve a unique vertical cut portion; (2) a main brush assembly mounted adjacent and against the main blade member to clear the cut grass and debris from an adjacent horizontal surface; and (3) a contoured cutter assembly mounted on the main blade assembly and having a contoured cutter assembly and a grass cutter member to achieve the unique contoured edge cut which cuts an adjacent portion of the grass area in an upwardly and outwardly inclined manner.

Still, one further object of this invention is to provide a lawn edger apparatus of a commercial type having a heavy-duty main blade assembly which is sturdy in construction; unique in operation; and requiring infrequent replacement relative to the prior art blade cutter structures.

Still, one further object of this invention is to provide a lawn edger apparatus which is of heavy-duty construction; reliable in operation; requiring minimum maintenance; and easily operable without requiring great skill on the part of the operator to achieve a uniform, unique, contoured edge cut.

Various other objects, advantages, and features of the invention will become apparent to those skilled in the art from the following discussion, taken in conjunction with the accompanying drawings, in which:

FIGURES OF THE INVENTION

The following is a discussion and description of preferred specific embodiments of the lawn edger apparatus of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

Figures 1, 2, 3:
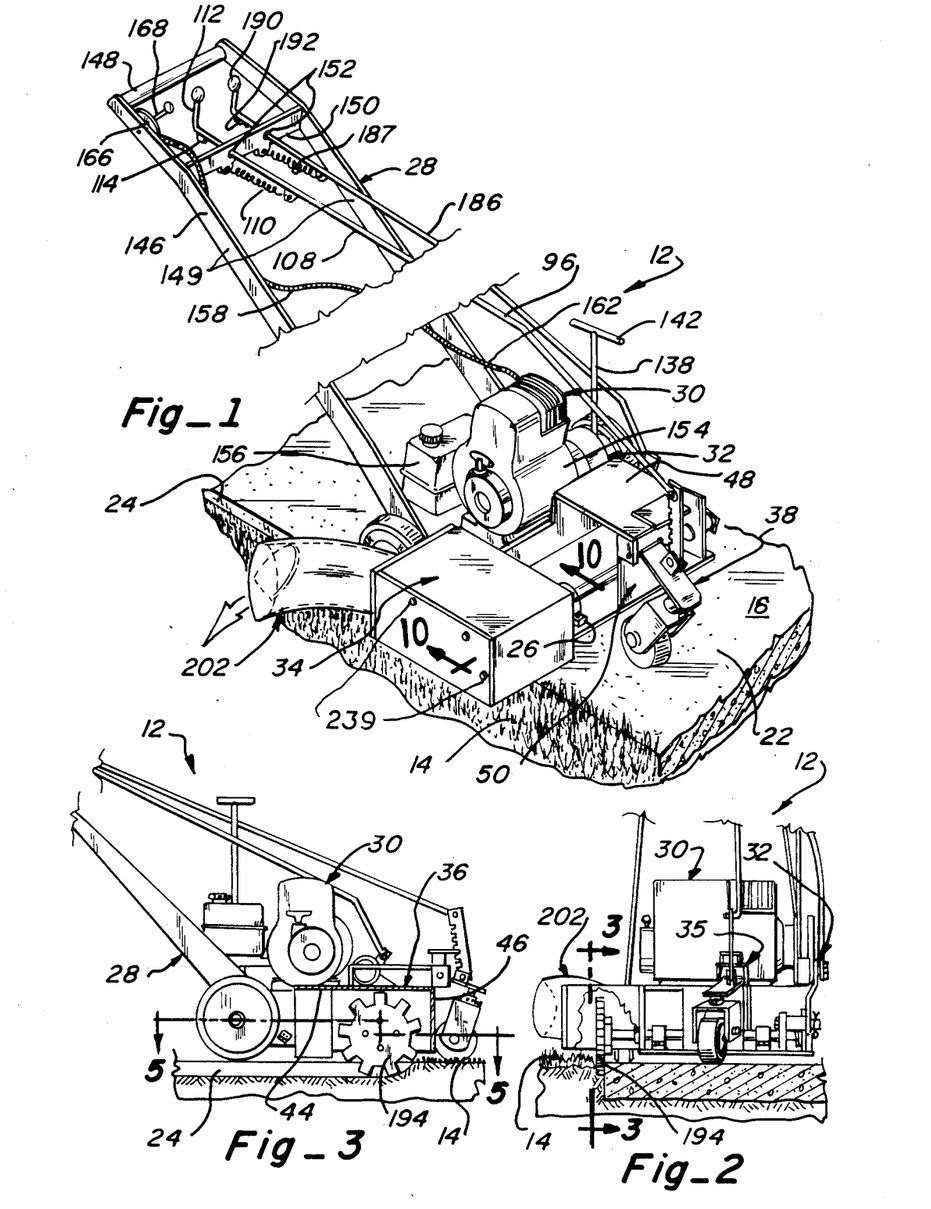
FIG. 1 is a foreshortened perspective view of a lawn edger apparatus of this invention as applied in a cutting operation between a concrete sidewalk surface and a grass area.
FIG. 2 is a fragmentary front elevational view of the lawn edger apparatus having portions thereof broken away for clarity.
FIG. 3 is a sectional view taken along line 3—3 in FIG. 2.
Figures 10, 11, 12:
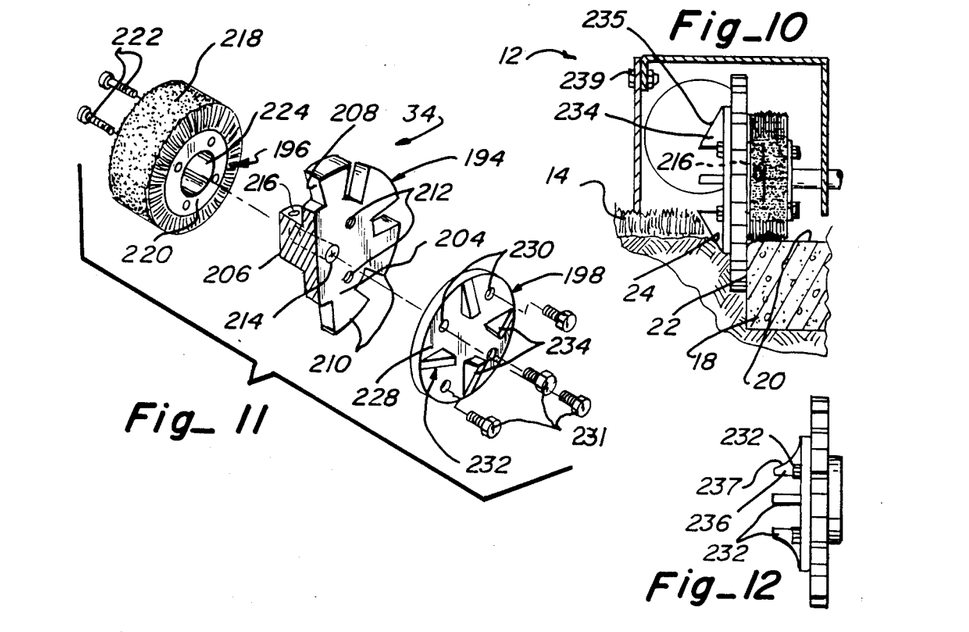
FIG. 10 is an enlarged fragmentary sectional view taken along line 10—10 in FIG. 1 illustrating the cooperation of the brush, blade, and adaptor cutter assemblies of this invention in a lawn edging operation.
FIG. 11 is an exploded perspective view illustrating means for interconnecting the brush, blades, and the adaptor cutter assemblies of this invention.
FIG. 12 is a side elevational view of interconnected blade and adaptor cutter assemblies of this invention.
Figures 13, 14, 15, 16, 17:
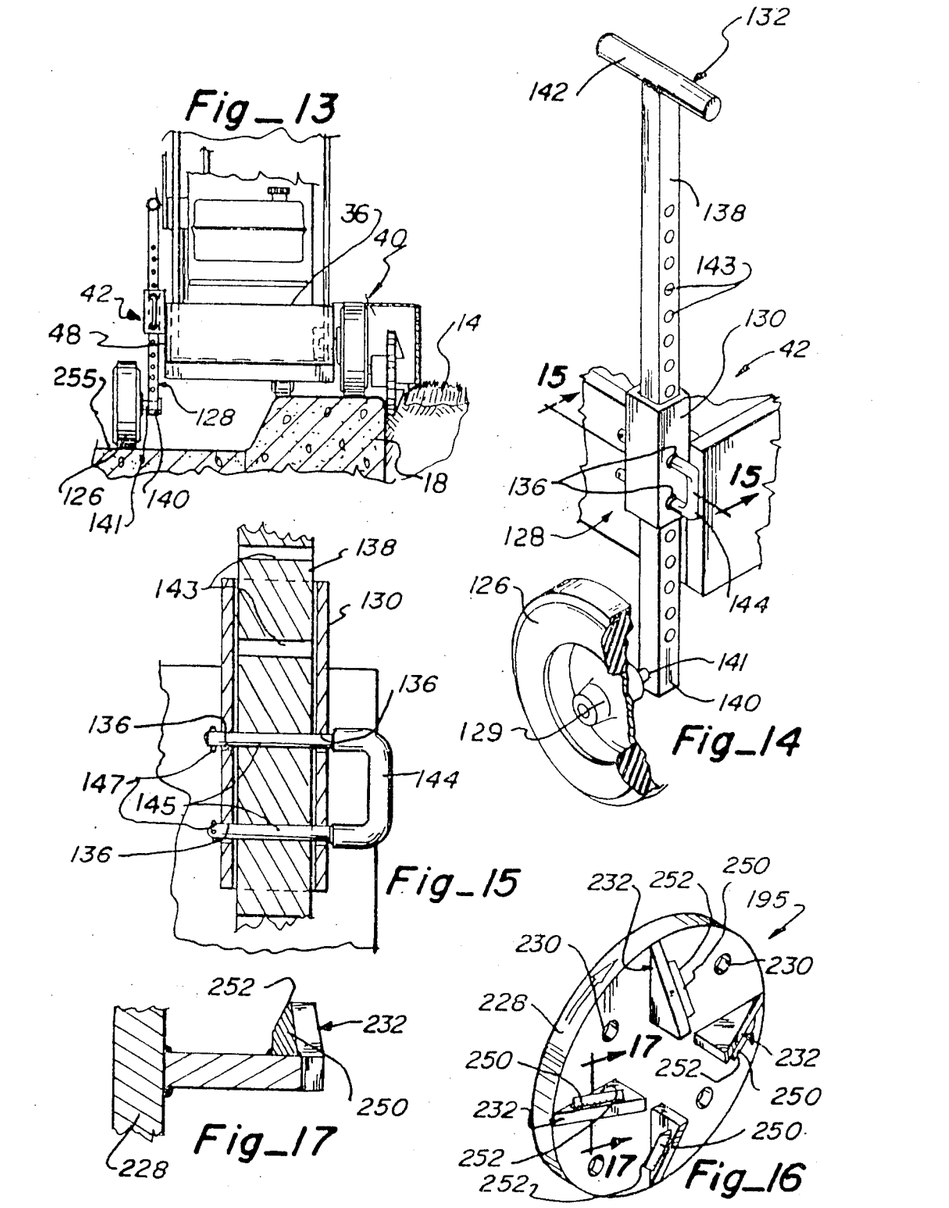
FIG. 13 is a rear elevational view of the lawn edger apparatus supported on a curb member and adjacent roadway surface illustrating a feature of an adjustable rear wheel assembly of this invention.
FIG. 14 is a fragmentary perspective view of the adjustable rear wheel assembly.
FIG. 15 is an enlarged fragmentary sectional view taken through line 15—15 in FIG. 14.
FIG. 16 is a perspective view of another embodiment of an adaptor cutter assembly of this invention.
FIG. 17 is an enlarged fragmentary sectional view taken along line 17—17 in FIG. 16.

Referring to the drawings in detail and, in particular to FIG. 1, a lawn edger apparatus of this invention, indicated generally at 12, is illustrated as being utilized to cut a grass area 14 adjacent to a concrete area 16 such as a sidewalk or a curb member 18. The lawn edger apparatus 12 is operable adjacent a curb member 18 having a horizontal support surface 20 and a vertical surface 22 to achieve a unique contoured edge cut 24. The exact shape of the unique contoured edge cut 24 is illustrated in FIGS. 10 and 13 being achieved in a manner to be explained.

The lawn edger apparatus 12 includes (1) a main support base assembly 26; (2) a main handle and control assembly 28 connected to the main support base assembly 26; (3) a main power supply assembly 30 mounted on the main support base assembly 26; (4) a belt and pulley drive assembly 32 operably connected to the main power supply assembly 30; and (5) a main edging and cleaning assembly 34 operably connected to and driven by the belt and pulley drive assembly 32 to achieve the contoured edge cut 24.

The main support base assembly 26 consists of (1) a support base member 36; (2) a front guide wheel assembly 38 connected to a central, forward portion of the support base member 36; (3) a rear wheel and cleaner assembly 40 connected to one rear side portion of the support base member 36; and (4) an adjustable rear wheel assembly 42 connected to another rear side portion of the support base member 36. The support base member 36 is of a generally rectangular shape similar to a lawn mower housing having a top wall member 48 integral with a downwardly extended front wall member 46 and parallel spaced side wall members 48. The top wall member 48 is elevated and supported in a horizontal plane by the joint efforts of the wheel assemblies 38, 40, and 42.

The front guide wheel assembly 38 includes (1) a guide wheel support housing 50; (2) an adjustable wheel assembly 52 connected to the guide wheel support housing 50; and (3) a wheel actuator assembly 54 operably connected to the adjustable wheel assembly 52 to regulate vertical adjustment thereof. The guide wheel support housing 50 includes (1) a top support member 56 secured to the front wall member 46 and top wall member 44; (2) an actuator plate member 58 connected to a top portion of the top support plate 56; and (3) wheel support plates 60 being parallel to each other and secured to the actuator plate member 58, the top support plate 56, and front wall member 46. The wheel support plates 60 each have aligned shaft openings 62 therein to receive and support the adjustable wheel assembly 52.

Figures 4, 5, 6, 7, 8:
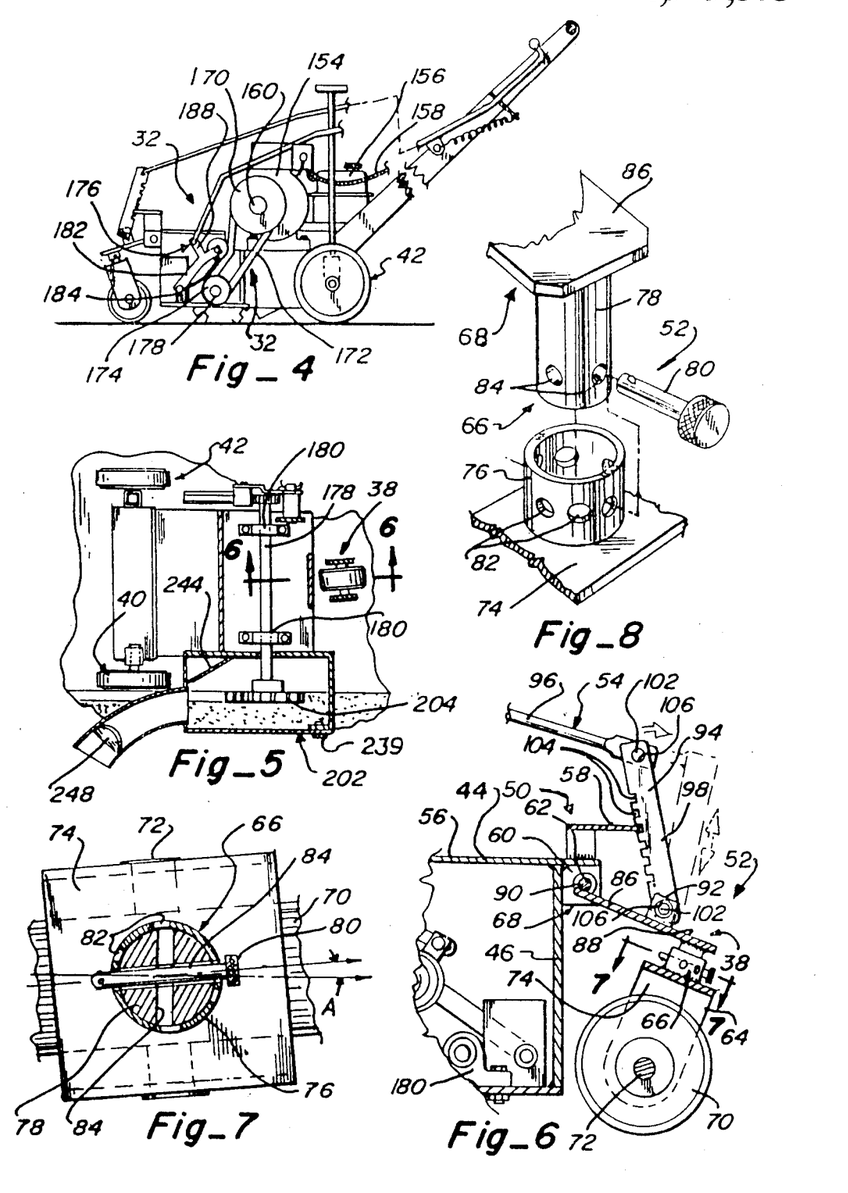
FIG. 4 is a foreshortened side elevational view of the lawn edger apparatus of the side opposite of FIG. 3.
FIG. 5 is a sectional view taken along line 5—5 in FIG. 3.
FIG. 6 is an enlarged fragementary sectional view taken along line 6—6 in FIG. 5.
FIG. 7 is an enlarged sectional view taken along line 7—7 in FIG. 6.
FIG. 8 is an exploded fragmentary perspective view illustrating a means of adjusting an angular position of a front guide wheel assembly.

As noted in FIG. 6, the adjustable wheel assembly 52 includes (1) a pivotal wheel assembly 64; (2) a wheel connector assembly 66 connected to the pivotal wheel assembly 64; and (3) a wheel plate assembly 68 which is connected to the wheel connector assembly 66 and to the spaced parallel wheel support plates 60.

The pivotal wheel assembly 64 is provided with a wheel member 70 rotatably mounted on a support shaft 72 which, in turn, is connected to a U-shaped yoke member 74.

As best noted in FIG. 8, the wheel connector assembly 66 includes (1) a first cylindrical connector member 76 secured to an upper surface of the yoke member 74; (2) a second cylindrical connector member 78 telescopingly mountable within the first connector member 76 and secured to the wheel plate assembly 68; and (3) an anchor lock pin 80 which is operably engagable through holes in the first connector member 76 and the second connector member 78 when in a selected adjusted position relative to each other.

The first connector member 76 is provided with first anchor holes 82 to receive the anchor lock pin 80 therethrough. The second connector member 78 is provided with second anchor holes 84 which are adapted to be aligned with the first anchor holes 82 in an adjusted position and held therein on insertion of the anchor lock pin 80 through the aligned holes. It is noted that at least four of the second anchor holes 84 are provided and the first anchor holes 82 have a plurality, namely six, so as to provide the desired angular adjustment thereof. The adjustment of the wheel member 70 is normally (1) straight ahead without any directional biasing effect; or (2) between 2-4 degrees (preferably 3 degrees) to the left as noted in FIGS. 5 and 7 for reasons to be explained.

The wheel plate assembly 68 includes (1) a main support plate 86 having a main body member 88 with one end mounted about a connector shaft 90 pivotally connected to the wheel support plates 60; and (2) a pair of adjacent spaced parallel connector lugs 92 secured to an upper surface of the main body member 88.

The wheel actuator assembly 54 includes (1) a wheel actuator rod 94 having a lower end pivotally connected between the connector lugs 92; and (2) an actuator linkage assembly 96 having one end pivotally connected to an upper end of the wheel actuator rod 94.

The wheel actuator rod 94 includes a main rod body 98 pivotally connected by connector bolt 102 between the parallel spaced adjacent connector lugs 92. The main rod body 98 is provided with a plurality of adjacent spaced anchor notches 104 for engagement with the actuator plate member 58 and having connector holes 106 at opposite ends thereof.

The actuator linkage assembly 96 includes (1) an elongated actuator link member 108 pivotally connected through a connector bolt 102 to the upper connector hole 106 in the wheel actuator rod 94; and (2) a bias member 110 mounted between the main handle and control assembly 28 and a portion of the actuator link member 108 to hold in an adjusted position.

The actuator link member 108 is provided with an upper handle section 112 and having latch portions 114 on an underside thereof which can aid in anchoring the actuator link member 108 in an adjusted position to hold same from moving axially when in subject position. The bias member 110 is a tension spring member which aids in holding the actuator link member 108 in the subject adjusted position.

Figure 9:
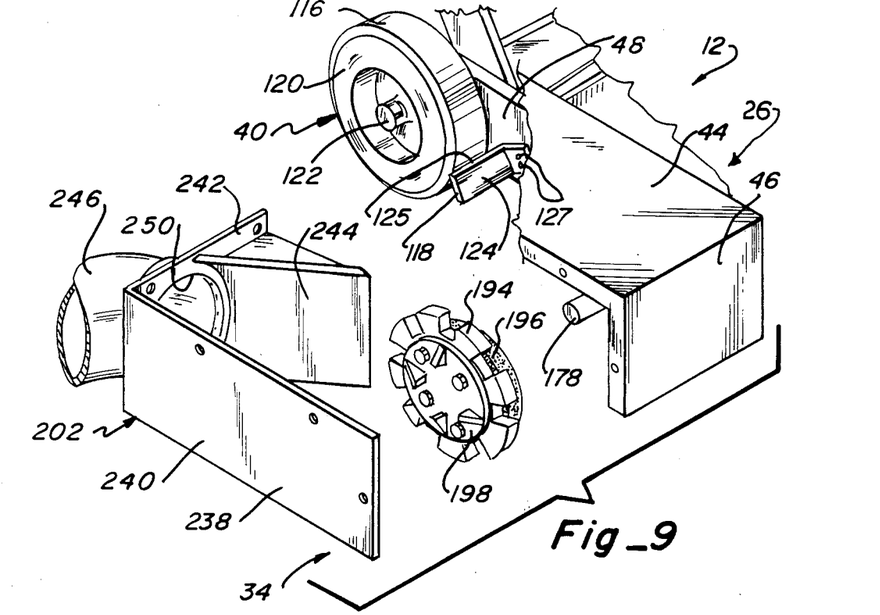
FIG. 9 is an exploded fragmentary perspective view illustrating a cover shield assembly placed about blade, brush, and adpater cutter assemblies of this invention.

As noted in FIG. 9, the rear wheel and cleaner assembly 40 includes a rear wheel assembly 116 and a cleaner assembly 118. The rear wheel assembly 116 includes a rotatable wheel member 120 mounted on a support shaft 112 through a bearing member which is connected to a side wall member 48 of the main support base assembly 26. The rear wheel assembly 116 operates as a conventional lawn mower wheel assembly and could be vertically adjustable if so desired.

The cleaner assembly 118 includes a scraper plate member 124 which is secured as by anchor screws 127 to the side wall member 48. The scraper plate member 124 is provided with an edge section 125 positioned adjacent the wheel member 120 so as to clean off debris, mud, or the like therefrom on rotation of the wheel member 120.

As noted in FIG. 13, the adjustable wheel assembly 42 includes an adjustable wheel member 126 rotatably and connected to an adjustable connector assembly 128 which, in turn, is secured to a side wall 48 of the support base assembly 36. The adjustable wheel member 126 is mounted on a shaft 141 through a bearing member 129 so as to be rotatable thereon.

The adjustable connector assembly 128 includes (1) an anchor housing 130; (2) a connector member 132 mounted within the anchor housing 130; and (3) a lock pin assembly 134 adapted to be placed through aligned openings in the connector member 132 and the anchor housing 130 to secure an adjusted position.

The anchor housing 130 is of square tubular shape provided with a plurality of aligned spaced sets of anchor holes 136. The connector member 132 is a rod of square tubular shape including a support shaft section 138 integral with a connector section 140 having an actuator handle member 142 secured to an upper end thereof. The lower end of the connector section 140 has the shaft 141 with the rotatable wheel member 126 connected thereto.

The support shaft section 138 is provided with a plurality of spaced connector holes 143 which are adapted to be aligned with respective pairs of the anchor holes 136 in the anchor housing 130 to receive the lock pin assembly 134 therethrough. The lock pin assembly 134 includes a pin member 144 of a generally U-shape which is adapted to be inserted through adjacent pairs of aligned anchor holes 136 and connector holes 143 in a vertically adjusted position of the connector member 132 relative to the anchor housing 130. The pin member 144 has parallel lock leg sections 145 inserted through the aligned holes 136, 143 and held in locked, secure condition by lock rings 147.

As noted in FIG. 1, the main handle and control assembly 28 includes a U-shaped handle member 146 which is pivotal at lower ends thereof to the main support base assembly 26 similar to a conventional lawn mower type structure. The U-shaped handle member 146 is provided with a grip section 148 for movement of the entire lawn edger apparatus 12 and a control support section 150 mounted between opposed side rails 149 of the handle member 146. The control support section 150 is provided with a pair of spaced control rod openings 152 to receive the actuator link member 108 of the actuator linkage assembly 96 through one thereof and the use of the other control rod opening 152 will be explained.

As noted in FIG. 1, the main power supply assembly 30 includes (1) an internal combustion engine member 154; (2) a fuel reservoir member 156 to supply fuel to the internal combustion engine member 154; and (3) a motor actuator assembly 158 operably connected to the internal combustion engine member 154 to control operation thereof. The internal combustion engine member 154 is of a conventional nature similar to that used on lawn mowers and is operable to rotate a drive shaft 160 (FIG. 4).

The motor actuator assembly 158 includes an accelerator control cable 162 mounted between a carburetor valve on the internal combustion engine member 154 and connected to an actuator handle member 166 which is connected to an upper portion of the main handle and control assembly 28 adjacent the grip section 148. The actuator handle member 166 is provided with a throttle member 168 which is operable in a conventional manner to control the operation and speed of the internal combustion engine member 154 and will result in desired rotation of the drive shaft 160.

As noted in FIG. 4, the belt and pulley drive assembly 32 includes (1) a drive pulley member 170 connected to the drive shaft 160 for rotation therewith; (2) a belt member 172 mounted about the drive pulley member 170; (3) a driven pulley member 174 also rotated and surrounded by the belt member 172; and (4) a belt tension actuator assembly 176 engagable with the belt member 172 in order to engage and drive the driven pulley member 174. The driven pulley member 174 is mounted on a driven shaft member 178 which is rotatably mounted within spaced support bearings 180 (FIG. 5). The driven shaft member 178 has an opposite end thereof connected to the main edging and cleaner assembly 34 for operation thereof in a manner to be explained.

The belt tension actuator assembly 176 includes (1) a tension actuator linkage 182 pivotally connected at one end to the main support base assembly 26; (2) a tension pulley member 184 rotatably connected to the tension actuator linkage 182; (3) a belt actuator rod 186 mounted between the tension actuator linkage 182 and extended through the other control rod opening 152 in the control support section 150 of the main handle and control assembly 28; and (4) a bias member 187 mounted between the belt actuator rod 186 and the control support section 150 (FIG. 1).

The tension actuator linkage 182 is a generally L-shaped actuator arm 188. The belt actuator rod 186 includes a handle section 190 and having a plurality of latched portions 192 which can be engagable with a portion of the control support section 150 to hold in an adjusted position. The bias member 187 is a tension spring member to hold the belt actuator rod 186 in a given adjusted position and providing pressure of the tension pulley member 184 against the belt member 172 in order to transfer rotation from the drive shaft 160 through the belt member 172 and the driven pulley member 170 to the driven shaft member 178.

The main edging and cleaning assembly 34 includes (1) a main blade assembly 194 mounted on the outer end of the driven shaft member 178; (2) a main brush assembly 196 mounted about the driven shaft member 178 and against the main blade assembly 194; (3) an adaptor cutter assembly 198 which is releasably connected to one side of the main blade assembly 194; and (4) a cover shield assembly 202 which is connected to the main support base assembly 26 and mounted about the blade, brush, and cutter assemblies 194, 196, and 198.

The adaptor cutter assembly 198 includes a second embodiment being an adaptor grass cutter assembly 195 which is utilized to produce a different type of contoured edge cut 24 as will be explained. The main blade assembly 194 includes a main blade member 204 having a brush mounting collar 206 integral therewith and extended laterally therefrom.

On referring to FIG. 11, the main blade member 204 includes (1) a thick plate material having spaced cut out sections 208 in between spaced cutting block sections 210; (2) plurality of threaded mounting holes 212 therethrough for attachment of the adaptor cutter assembly 198 thereto; and (3) a central drive shaft opening 214 to receive the driven shaft member 178 for securing therethrough.

The brush mounting collar 206 has an opening therein aligned with the drive shaft opening 114 to receive one or more set screws 216 for anchoring to the driven shaft member 178 for conjoint rotation therewith.

As noted in FIG. 11, the main brush assembly 196 includes a main brush member 218 secured to a mounting collar 220 and having a plurality of connector bolt members 222 used to anchor the main brush member 218 to the main blade member 204.

The mounting collar 220 is provided with a central mounting hole 224 to be received about the brush mounting collar 206 of the main blade assembly 194.

The adaptor cutter assembly 198, as best shown in FIG. 11, includes a main support plate 228 having spaced mounting holes 230 therein and a plurality, namely four, contour cutter assemblies 232 extended from one side thereof. A plurality of bolt members 231 are operable to be extended through the spaced mounting holes 230 into the threaded mounting holes 212 for securing same to the outer abutting surface of the main blade member 204 and being releasably connected thereto.

The contour cutter assembly 232 can be one of two embodiments, the first having right angle cutters 234 with outer sharpened cutter sections 235. This is operable to cut the contoured edge cut 24 as noted in FIG. 10.

FIG. 12 sets forth the second embodiment of the contour cutter assembly 232 being contour cutters 236. These contoured cutters 236 have an arcuate cutter section 237 which will thereupon cut a curved surface instead of a straight line surface which is achieved by the right angle cutters 234.

As noted in FIG. 9, the cover shield assembly 202 includes an enclosure housing 238 releasably secured as by anchor members 239 to the main support base assembly 26. The enclosure housing 238 includes a side wall 240 integral with a rear wall 242 and a first deflector plate 244 to direct cut materials and debris rearwardly and laterally into a discharge tube 246 which then directs same outwardly to a second deflector plate 248 (FIG. 5). The rear wall 242 is provided with a discharge opening 250 having the discharge tube 246 secured thereto. The first and second deflector plates 244, 248 cooperate to receive and convey the moving debris and grass materials outwardly, laterally, and downwardly for a proper, safe discharge therefrom.

As noted in FIG. 16, the embodiment of the adaptor cutter assembly 198, being the adaptor and grass cutter assembly 195, includes the main support plate 228 with a plurality of spaced mounting holes 230 having the contour cutter assemblies 232 extended from one side thereof. The contour cutter assemblies 232 is as previously described which can be provided with one of two embodiments being right angle cutters 234 or contour cutters 236.

The novelty in the adaptor and grass cutter assembly 195 is the use of grass cutter members 250 being of a rectangular shape having an outer cutter portion 252. This edge outer section 252 extends perpendicular to respective ones of the right or angular contour cutters 234, 236 and are operable to contact and cut the grass material at a desired angle such as between 30 to 60 degrees and, preferably, 45 degrees on rotation thereof.

USE AND OPERATION OF THE INVENTION

In the use and operation of the lawn edger apparatus 12 of this invention, it is noted in FIG. 1 that the same is operable to cut a contoured edge cut 24 between adjacent abutting portions of the grass area 14 and the concrete area 16. This can be a curb member 18 or any place where a grass area 14 is abutting a concrete area 16 or other hard surfaces such as asphalt, brick, or the like.

The lawn edger apparatus 12 is operable similar to a conventional lawn mower structure in having the main power supply assembly 30 with the internal combustion engine member 154 operable through the motor actuator assembly 156 to control engine speed in a conventional manner. After the internal combustion engine member 154 has been energized, it is noted that the belt and pulley drive assembly 32 is operable through the belt tension actuator assembly 176 to move the tension pulley member 184 into contact with the belt member 172 and, thus, transfer rotation from the drive shaft 160 of the internal combustion engine member 154 to the driven pulley member 174. This movement of the tension pulley member 184 through the belt actuator rod 186 operates to apply movement to the driven pulley member 174 and driven shaft member 178 which then is transferred to the main edging and cleaning assembly 34.

Before starting a cutting operation, the first guide wheel assembly 38 is operable through the wheel actuator assembly 54 and, more particularly, the actuator linkage assembly 96 to pivot the wheel member 70 to achieve the desired height of the main support base assembly 26 from a support surface such as the concrete area 16 to achieve a desired depth of cut by the main edging and cleaning assembly 34. On reaching the desired height adjustment, the actuator linkage assembly 96 with the actuator link member 108 is anchored in the desired position with the control support section 150 to hold same in such adjusted position. It is seen that one of the anchor notches 104 on the wheel actuator rod 94 is placed into engagement with the actuator plate member 58 of the guide wheel support housing 50 to hold in the adjusted position.

Next, the adjustable wheel assembly 52 can be pivoted about an upright axis to adjust the wheel member 70 on relative rotation of the first and second connector members 76, 78 to a desired angular position and locked in such position by the anchor lock pin 80. This provides a slight turning movement of the front guide wheel assembly 38 as noted in FIG. 5 to bias the main blade assembly 194 of the main edging and cleaning assembly 34 toward engagement with the vertical surface 22 of the curb member 18 or a similar structure. This biasing effect achieves a desired clean cut and removal of all grass against the curb member 18 to achieve the contoured edge cut 24.

The turning adjustment of the wheel member 70, as noted by letter "A" in FIG. 7, is between 2-4 degrees and preferably 3 degrees from a vertical plane parallel to vertical planes of the parallel wheel members 120, 126. In some applications, it may be desirable to not have any turning adjustment of the wheel member 70.

On starting a cutting operation, the rotating main blade member 194 creates a forward pulling effect of the entire lawn edger apparatus 12 while achieving the contoured edge cut 24 as noted in FIG. 1.

Also, it is noted that the main brush assembly 196 mounted adjacent the main blade assembly 194 is of a a height less than the outer diameter of the main blade member 204 and operates to clean off dirt and grass on the adjacent horizontal surface 20 of the curb member 18 as best noted in FIG. 10.

If desired, the contour cutter assembly 232 can have the right angle cutters 234 replaced with the contour cutters 236 to achieve a different shape of the contoured edge cut 24.

As noted in FIG. 13, it is seen that the adjustable rear wheel assembly 42 and, more specifically, the adjustable connector assembly 128, can be operable to lower the adjustable wheel member 126 downwardly to contact a roadway surface 255 adjacent to a curb member 18. The adjustment can be made in half-inch or one-inch increments so as to place the main support base assembly 26 of the lawn edger apparatus 12 in a generally horizontal position while achieving the contoured edge cut 24. This is an important feature of the invention as it allows the lawn edger apparatus 12 to be operable in either direction of movement and especially when a sidewalk or the like is not provided having a flat, even surface for support while achieving the contoured edge cut 24 of this invention. This is a labor and time-saving feature as lawn edger apparatus 12 can then be utilized in each direction of travel whether on a roadway or a sidewalk surface.

As noted in FIG. 14, the adjustable connector assembly 128 uses the lock pin member 144 which is easily removable so that the height of the wheel member 126 can be easily adjusted.

As noted in FIGS. 16 and 17, an additional embodiment of the adaptor cutter assembly 198 is the adaptor and grass cutter assembly 195. This has the main support plate 228 with the contour cutting assembly 232 provided with grass cutter members 250 secured to either the right angle or contour cutters 234, 236 and extended perpendicular thereto. The edge cutter section 252 achieves a further cutting of the adjacent grass material at a desired angle such as 30 to 60 degrees or, preferrably, 45 degrees, so as to achieve a new and novel contoured edge cut 24 having the adjacent grass material severed at the desired angle. This provides for a more attractive appearing contoured edge cut 24 and increases the time it would take for the grass to grow back toward a curb member 18 after a lawn edging operation.

As noted in FIG. 9, another novelty of this invention is the use of the cleaner assembly 118 adjacent the wheel member 120 in the rear wheel and cleaner assembly 40. This operates to achieve an automatic cleansing of the outer surface of the wheel member 120 during rotation thereof. This is important when utilizing the lawn edger apparatus 12 in newly sodded or mud situations in order to provide for constant cleaning of the wheel member 120.

The lawn edger apparatus 12 is the first known heavy duty structure to be designed and manufactured for the commercial lawn care professional. The prior art lawn edger structures use a rectangular blade similar to, but smaller than, a horizontally rotating lawn mower blade member. These prior art structures are (1) hard to use; (2) apply little pressure against the soil being edged; (3) vibrate considerably so it is hard to obtain a straight, uniform edge; and (4) dangerous to operate.

An important feature of the lawn edger apparatus 12 of this invention is the rigid mounting of the main edging and cleaning assembly 34 to the driven shaft member 178 which, in turn, is supported for rotation in the support bearings 180 secured to the support base member 36. Therefore, the combined weight of the support base member 36; the main handle and control assembly 28; the internal combustion engine member 154; and the belt and pulley drive assembly 32 acts to hold the main edging and cleaning assembly 34 firm and sturdy during a lawn edging operation. Being able to cut a straight, uniform, contoured edge cut 24 without the use of highly skilled labor is important to the professional lawn care specialist. The prior art non-commercial type lawn edger structures pivot the cutting blade itself without the weight of the power supply assembly aiding in holding the cutting blade steady.

This heavy duty commercial type feature is achieved by the positioning of the front guide wheel assembly 38 at the front of the support base member 36 for pivotal height adjustment. This pivotal adjustment about the connector shaft 90 keeps substantially all of the weight of the lawn edger apparatus 12 on the rotating main edging and cleaning assembly 34.

By having this weight on the main edging and cleaning assembly 34, the main blade assembly 194 can be used to clean out cracks in asphalt or concrete paving prior to patching with a crack filler. The main blade assembly 194 will create a rectangular shaped cut of a desired depth in the paving for superior, long-lasting, patching results.

The prior art edging blade members are ⅛ inch in thickness whereas the main blade member 204 of this invention is at least ⅜ inches in thickness and could be ½ inch in thickness.

In one preferred embodiment of the main blade member 204 as noted in FIG. 3, there are nine (9) cutting block sections 210, each being separated by a cut out section 210. The cutting block sections 210 act to sever the grass area 16 or hard material and lift the severed material upwardly and outwardly to achieve the contoured edge cut 24.

Due to the sturdy, heavy duty construction of the main blade member 204 with the weight of the lawn edger apparatus 12 applied thereto, the operator can achieve the uniform contoured edge cut 24 in a minimum amount of time without risk of injury which is present in the prior art lawn edger structures.

It is seen that the lawn edger apparatus of this invention is easy to operate with means for controlling engine speed; belt tensioning; rotational speed of the main edging and cleaner assembly; height adjustment of the front guide wheel assembly; angular adjustment of the front guide wheel assembly to achieve a biasing effect in one direction of the overall lawn edger apparatus; and height of an adjustable rear wheel assembly so that the lawn edger apparatus can have the rear wheel member supported on the roadway adjacent to an elevated curb member.

Additionally, the cover shield assembly is operable to protect the operator of the lawn edger apparatus from the rotating members of the main edging and cleaner assembly and operable to receive, direct, and discharge the cut debris and grass material rearwardly, laterally, and downwardly therefrom for safety purposes. The cover shield assembly achieves a dispersement of the debris and grass material onto the adjacent lawn area not requiring a subsequent sweeping and collecting thereof from the horizontal surface of the adjacent curb member or concrete area. This provides for substantial labor and resultant monetary savings by not having to cleanse off the adjacent sidewalk or curb member areas.

The lawn edger apparatus of this invention is sturdy in construction; reliable in operation; easy to use; not requiring highly skilled labor to utilize; fast in an edging operation to achieve savings in labor costs; utilizing a rigid, sturdy, main blade assembly requiring infrequent maintenance and replacement; and provided with various embodiments of adaptor cutter assemblies which can be connected to the main blade assembly to achieve unique and different contoured edge cuts.

While the invention has been described in conjunction with preferred specific embodiments thereof, it will be understood this description is intended to illustrate and not to limit the scope of the invention, which is defined by the following claims:

I claim:

1. A lawn edger apparatus operable to create a contoured edge cut in a support surface in an abutting area between a grass area and a solid material, comprising:
   (a) a main support base assembly mounted on wheel support assemblies and movable over the support surface similar to a lawn mower;
   (b) a main power supply assembly mounted on said main support base assembly and operable to rotate a drive shaft;
   (c) a main edging and cleaning assembly connected to said drive shaft to cause rotation thereof;
   (d) said main edging and cleaning assembly includes a main blade assembly to cut an upright portion of the contoured edge cut, a main brush assembly mounted adjacent said main blade assembly to cleanse an upper surface of the solid material, and an adaptor cutter assembly connected to said main blade assembly to cut a contoured portion of the contoured edge cut;
   (e) said adaptor cutter assembly includes a main support plate with a contour cutter assembly secured thereto; and
   (f) said contour cutter assembly includes a plurality of right angle cutters extended laterally from said main support plate and operable to create a right angle cut portion of the contoured edge cut in the support surface with the right angle cut portion integral with and above the upright portion of the contoured edge cut.

2. A lawn edger apparatus as described in claim 1, wherein:
   (a) said main edging and cleaning assembly includes a cover shield assembly mounted about said main blade assembly, said main brush assembly, and said adaptor cutter assembly to receive and direct severed debris and severed material rearwardly, laterally, and downwardly from said main support base assembly.

3. A lawn edger apparatus as described in claim 1, wherein:
   (a) said adaptor cutter assembly includes a main support plate with a contour cutter assembly secured thereto; and
   (b) said contour cutter assembly includes a plurality of right angle cutters extended laterally from said main support plate and operable to create a right angle cut portion of the contoured edge cut in the support surface.

4. A lawn edger apparatus as described in claim 1, wherein:
   (a) said contour cutter assembly having a plurality of contoured cutters extended laterally from said support plate to create an arcuate cut portion of the contoured edge cut in the support surface.

5. A lawn edger apparatus as described in claim 1, wherein:
   (a) said adaptor cutter assembly includes an adaptor and grass cutter assembly; and
   (b) said adaptor and grass cutter assembly include a grass cutter member connected to and laterally extended from said right angle cutters to sever a grass area adjacent to the contoured edge cut in the support surface.

6. A lawn edger apparatus operable to create a contoured edge cut in a support surface, comprising:
   (a) a main support base assembly mounted on wheel support assemblies and movable over the support surface similar to a lawn mower;
   (b) a main power supply assembly mounted on said main support base assembly and operable to rotate a drive shaft;
   (c) a main edging and cleaning assembly having a main blade assembly operably connected to said drive shaft to cause rotation of said main blade assembly;
   (d) said main support base assembly includes a front guide wheel assembly in contact with the support surface;
   (e) said front guide wheel assembly includes an adjustable wheel assembly pivotally connected to said main support base assembly and movable about a horizontal axis to adjust the depth of the contoured edge cut achieved by said main blade assembly;
   (f) said adjustable wheel assembly having a wheel member pivotal about an upright axis to bias said lawn edger apparatus in a lateral direction while creating the contoured edge cut in the support surface; and
   (g) said wheel member selectively adjusted to a straight ahead position or to a lateral position to bias said lawn edger apparatus to either side of the straight ahead position.

7. A lawn edger apparatus operable to create a contoured edge cut in a support surface, comprising:
   (a) a main support base assembly mounted on wheel support assemblies and movable over the support surface similar to a lawn mower;
   (b) a main power supply assembly mounted on said main support base assembly and operable to rotate a drive shaft;
   (c) a main edging and cleaning assembly having a main blade assembly operably connected to said drive shaft to cause rotation of said main blade assembly;
   (d) said main blade assembly including a generally circular main blade member having cutting teeth thereon to cut a rectangular portion of the contoured edge cut in the support surface;
   (e) said main edging and cleaning assembly includes an adaptor cutter assembly mounted against said main blade member and operable to create a contoured portion of a contoured edge cut;
   (f) said adaptor cutter assembly includes a main generally circular support plate having an integral contoured cutter assembly extended laterally therefrom;
   (g) said main support plate releasably connected to said main blade member; and
   (h) said contoured cutter assembly includes right angle cutters provided on said support plate to achieve a right angle cut portion in the support surface as a part of the contoured edge cut.

* * * * *